United States Patent
Tavares Cortes et al.

(10) Patent No.: US 10,358,382 B2
(45) Date of Patent: Jul. 23, 2019

(54) PRODUCTION METHOD FOR SHEETS OF GLASS WITH A DIFFUSE FINISH, AND RESULTING SHEET OF GLASS

(71) Applicant: Vidrio Plano de Mexico S.A. de C.V., Neuvo Leon (MX)

(72) Inventors: Jose Luis Tavares Cortes, Nuevo Leon (MX); Arturo Si Ming Lamshing Tai, Nuevo Leon (MX); Gerardo Soto Puente, Nuevo Leon (MX); Jorge Sanchez-Gonzalez, Nuevo Leon (MX)

(73) Assignee: Vidrio Plano de Mexico, S.A. de C.V., Nuevo León (MX)

( * ) Notice: Subject to any disclaimer, the term of this patent is extended or adjusted under 35 U.S.C. 154(b) by 184 days.

(21) Appl. No.: 15/322,284

(22) PCT Filed: Jun. 27, 2014

(86) PCT No.: PCT/MX2014/000098
§ 371 (c)(1),
(2) Date: Dec. 27, 2016

(87) PCT Pub. No.: WO2015/199525
PCT Pub. Date: Dec. 30, 2015

(65) Prior Publication Data
US 2018/0215656 A1    Aug. 2, 2018

(51) Int. Cl.
*C03C 15/00* (2006.01)
*C03C 15/02* (2006.01)
*G02B 5/02* (2006.01)

(52) U.S. Cl.
CPC .............. *C03C 15/00* (2013.01); *C03C 15/02* (2013.01); *C03C 15/025* (2013.01);
(Continued)

(58) Field of Classification Search
CPC ........ C03C 15/00; C03C 15/02; C03C 15/025; G02B 5/0268; G02B 5/0221
(Continued)

(56) References Cited

U.S. PATENT DOCUMENTS 2,348,704 A   5/1944  Adams
2,461,840 A   2/1949  Nicoll
(Continued)

FOREIGN PATENT DOCUMENTS

WO      2010107291 A1     9/2010

*Primary Examiner* — Binh X Tran
(74) *Attorney, Agent, or Firm* — The Webb Law Firm

(57) ABSTRACT

The present invention relates to a process for manufacturing glass sheets with diffuse finish and the resulting glass sheet by this process. The glass sheet is subjected to a series of alternate immersions in acidic solutions and alkaline solutions to remove impurities and waste and to generate a diffuse finish on both sides of the glass sheet. The process generates in the glass sheet in at least one side, a diffuse surface with a peak to valley roughness (Rt) of between 5.8343 μm and 9.3790 μm; an average roughness (Ra) value between 0.8020 μm and 0.9538 μm; an RMS roughness between 0.9653 μm and 1.1917 μm; a solar transmission between 84.8% and 46.50%; a solar reflection between 7.4 and 4.4%; a light transmission between 88.5% and 67.70%; a reflection of light between 6.50% and 5.20%; and UV transmission between 35.60% and 70.20%.

15 Claims, 4 Drawing Sheets

(52) U.S. Cl.
CPC ......... *G02B 5/0221* (2013.01); *G02B 5/0268* (2013.01); *G02B 5/0294* (2013.01)

(58) Field of Classification Search
USPC .............................................. 216/31, 97, 98
See application file for complete search history.

(56) References Cited

U.S. PATENT DOCUMENTS

| | | | |
|---|---|---|---|
| 2,486,431 | A | 11/1949 | Nicoll et al. |
| 4,434,191 | A | 2/1984 | Cook et al. |
| 8,419,965 | B1* | 4/2013 | Nemeth .................. C03C 15/00 216/103 |
| 2003/0170459 | A1 | 9/2003 | Lin |
| 2011/0317257 | A1* | 12/2011 | Rendon Granados ...................... C03C 15/00 359/350 |
| 2012/0134024 | A1* | 5/2012 | Lander .................... C03C 15/00 359/599 |
| 2012/0214270 | A1* | 8/2012 | Stockum ........... H01L 31/02168 438/71 |
| 2012/0218640 | A1* | 8/2012 | Gollier .................... C03C 15/00 359/609 |
| 2015/0175478 | A1* | 6/2015 | Ravichandran ......... C03C 15/00 428/141 |
| 2015/0187965 | A1* | 7/2015 | Stockum ............. H01L 31/1804 438/98 |
| 2015/0277023 | A1* | 10/2015 | Etienne ................ G02B 6/0025 362/613 |
| 2015/0299029 | A1* | 10/2015 | Tachiwana .............. C03C 3/247 501/44 |
| 2016/0107928 | A1* | 4/2016 | Bayne .................... C03C 17/09 428/429 |

* cited by examiner

PRODUCTION METHOD FOR SHEETS OF GLASS WITH A DIFFUSE FINISH, AND RESULTING SHEET OF GLASS

CROSS-REFERENCE TO RELATED APPLICATIONS

This application is the United States national phase pf International Application No. PCT/MX2014/000098 filed Jun. 27, 2014, the disclosure of which is hereby incorporated in its entirety by reference.

FIELD OF THE INVENTION

The present invention shows a manufacturing process for glass sheets with diffuse finish, and more specifically, to a manufacturing process for producing a diffuse glass by immersion in acidic solutions modifying its optical properties and giving it a diffuse finish.

BACKGROUND

Ever since manufacturing a continuous glass sheet over a layer of tin was in 1959 (float process) was achieved, applications thereof have diversified encompassing many markets; from applications in the construction market to its use with complex forms in the automotive market.

One of the applications of float glass is the protection of works of art and portraits, along with a frame made of wood or other materials. The primary purpose of covering artwork is the physical protection of the same from factors such as humidity, heat and stains. Glass is also used because it provides good levels of protection from UV rays which can attack the pigments of artwork whose protection is intended and eventually cause discoloration.

However, a common problem that occurs when using flat glass as protection for works of art is that when a viewer stands before a piece framed with this material, instead of seeing the work of art, the viewer will see its own reflection. In order to eliminate this effect caused by light reflection, several alternatives have been researched and the most widespread solution is the use of diffuse flat glass. Now, the way in which diffuse flat glass avoids reflections is by treating its surface with acidic solutions. This prevents glare by adding irregularities to the surface.

Generally, in making this diffuse glass, clear flat glass is used due to its high market availability and low cost compared to other glass types. Typical thickness of this glass ranges from 2.0 mm to 2.5 mm. Conventional clear glass with this thickness has a light transmittance of about 90% and a reflection of 8%. By giving glass an acid treatment, the reflection level is lowered to about 1%.

There is another raw materials option with low contents of iron that has been used in recent years but has a higher cost. The advantages of using this type of raw material is that it has a higher light transmission, around 92%, which allows a better perception of the image that is being protected. By performing the same acid treatment, it is possible to obtain the same level of reflection that is achieved with conventional clear glass which is 1%.

There are other options that can be used for the same purpose, although they involve the use of a complex or high-tech process, thereby making their manufacturing cost much higher. One of these options is anti-reflective (AR) glass manufactured by cathode pulverizing technology (sputtering).

Because of its cost, this type of glass is normally used for high value applications such as monitor screens or windows that are part of display cases. The most common configurations used in this type of products consists of alternating one high refractive index film (e.g. $TiO_2$) with one of low refractive index (e.g. $SiO_2$). Generally, the level of reflection achieved depends on the number of alternating films, where the product having lower performance has at least 4 films.

There are other materials that have been used trying to obtain a behavior similar to that of glass but showing a lower light reflection, one of them is acrylic sheet, which has a high light transmission and an optical quality similar to that of glass. It shows a great advantage against glass from a density viewpoint, since acrylic sheet is a very light material, but it has the disadvantage of being easily scratched and retains static charge which is detrimental to certain types of art (technique of pastel and charcoal), so it has not been very successful for anti-reflective applications.

Moreover, since the 40s attempts have been made to alter the surface of glass and give it a diffuse appearance by etching. For example, U.S. Pat. No. 2,348,704 (1944) issued to Frederick W. Adams proposes reducing reflection of light coming from a glass surface by using acids. This forms a thin film which is an interference between the exposed film surface and the glass surface covered by the film. The study described by Adams consists in treating glass with a strong mineral acid, in this case nitric acid 0.5 N in order to remove the basic glass components that are on the surface without attacking the $SiO_2$. Subsequently, a dilute solution of hydrofluoric acid 0.1% by volume is used. It is well known nowadays that the use hydrofluoric acid in such low concentrations entails a long attack time to obtain the anti-reflective characteristics obtained by Adams, therefore it is not very practical to apply these findings in a production process.

U.S. Pat. No. 2,486,431 issued to Frederick H. Nicoll and Ferd E. Williams also describes the use of a solution of 0.5N nitric acid. Flat glass is immersed in this solution to generate a degradation of the glass surface microscopically eliminating planarity of the surface and forming porosity therein. Once this is achieved, the reaction with nitric acid is interrupted to continue flat glass immersion in a solution of hexafluorosilicic acid with concentrations ranging from 0.3 to 3.0 moles/liter working at temperatures between 35 and 55° C. Like the work done by Adams, again the problem of working with very low concentration solutions which need to be changed very quickly in a production process is presented. This is because each sheet immersed in the Hexafluorosilicic acid solution weakens the acid concentration, therefore in each batch that is made to obtain diffuse flat glass, adjustments are necessary to immersion times making it an uneconomic and unstable process.

In U.S. Pat. No. 2,461,840 issued to Frederick H. Nicoll, another method was explored to obtain diffuse flat glass, whereby it was not necessary to immerse the flat glass sheet in acid. Nicoll found that hydrofluoric acid vapor can generate a diffuse surface in the flat glass with no need to previously use other mineral acids. To accomplish this purpose, a tank with a wax cover was designed where a 1% solution of hydrofluoric acid was placed. This tank in turn was immersed in a larger tank which contained water, which was used to control the temperature of hydrofluoric acid present in the main tank. Subsequently, a flat glass sheet was placed over the main tank, which would be exposed to attack from hydrofluoric acid vapor, generating a diffuse surface on one of the sheet faces. By using this set of tanks, the vapor pressure of hydrofluoric acid can be manipulated to decrease attack times on the flat glass sheet. The main disadvantage of this process is that it can be applied only to one of the two flat glass surfaces, in addition to requiring long times to obtain the desired finish (minimum time 40 minutes), whereby scaling this type of batch process to industrial level does not seem to be profitable.

There are other methods not using acids to reduce reflection of light from the surface of flat glass, as described by Cook et al. (U.S. Pat. No. 4,434,191) where the possibility of using electrolyte solutions having a dissociation constant greater than 10-6 at a temperature of 20° C. is suggested. This type of method permits treating flat glass by immersion in electrolyte solutions, which have a neutral pH close to 7.0. In particular, by using this method it is possible to generate a high quality anti-reflective coating on the surface of flat glass which can be used for optical applications. The disadvantage of this method, like those mentioned above, is that it requires very long exposure times of flat glass to the electrolyte solution. Cook mentions in his work that normal times to achieve the anti-reflective coating range from 12-90 hours. Unfortunately, these times prevent having an industrial production unless having extremely large containers, which would involve a very high investment.

Efforts have made to obtain a production process for treating both surfaces of glass simultaneously, but undoubtedly the processes closer to achieving the desired goal are those involving immersion of flat glass sheets in acidic solutions.

Per the above, the present application discloses a batch type industrial process to produce several diffuse finish sheets of flat glass simultaneously, reducing considerably the value of reflection of specular light allowing applying the obtained product for protection of photographs and artwork.

OBJECTIVES OF THE INVENTION

It is therefore a first object of the present invention, to provide a production method for sheets of glass with a diffuse finish, and resulting sheet of glass, which allows obtaining a satin and diffuse finish on both surfaces of the glass sheet.

It is another object of the present invention to provide a production method for sheets of glass with a diffuse finish by immersion in acid solutions, modifying its optical properties and giving them a diffuse finish.

A further object of the present invention is to provide a production method for sheets of glass with a diffuse finish providing a reflection level of about 1%.

Another object of the present invention is to provide a production method for sheets of glass with a diffuse finish, which provides an average roughness of 0.8020 µm to 0.7081 µm.

These and other objects and advantages of the manufacturing process of glass sheets with diffuse finish of the present invention will become apparent to those skilled in the art, from the following detailed description.

DETAILED DESCRIPTION OF THE INVENTION

Figure 1:
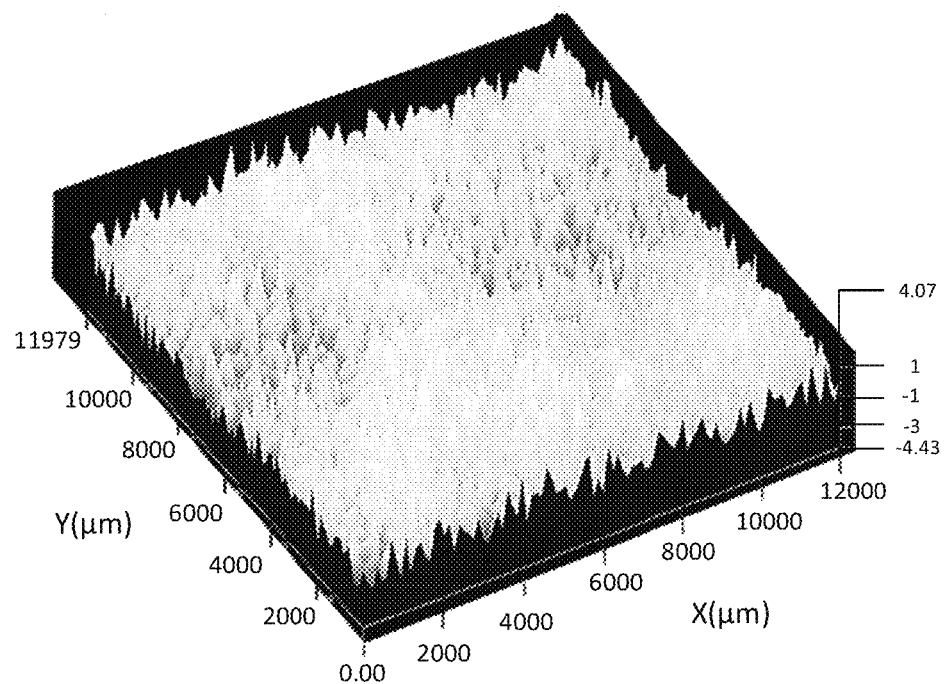
FIG. 1 a shows an image of roughness for ATR glass, 3-dimensional, side one.

Referring to the manufacturing process of glass sheets comprising the following steps:

a) Providing Flat Glass Plates

For the start of the manufacturing process, packages of flat glass are supplied, to be processed in groups, which are received in storage racks specially designed so that the glass does not suffer any damage either by scratches or breaks.

b) Immersion of Glass Plates in an Acid Solution

The next step is to introduce at least one glass sheet in a first acidic solution. Such a solution may be a solution of 32.5% hydrochloric acid for a time from 20 to 60 seconds, to remove all impurities that may be present in the sheets of flat glass such as any remains of separator dust, fingerprint marks, glove stains, etc. This process is carried out in a container that can process from 1 to 7 sheets of minimum size 1200 cm by 1800 cm and maximum dimensions of 1800 cm by 2600 cm with thicknesses ranging from 2.0 mm to 19 mm which is equivalent to processing from 75.6 kg to 1556.1 kg of glass.

c) Rinsing Glass Sheets.

Once the glass sheet has been subjected to the acidic solution, the sheets are subjected to a washing or rinsing process to remove the remaining acid solution and avoid the formation of lines and undesirable marks in the flat glass.

d) Immersion of Glass Sheets in a Second Acidic Solution

Once the remains of the first acidic solution (hydrochloric acid) are removed, the sheet or sheets of glass are subjected to a second immersion in a second acidic solution composed of a mixture of 70% ammonium difluoride and 30% hydrochloric acid 32.5% for a period of between 30 seconds and 300 seconds. Immersing the glass sheets in this mixture produces a finish on both sides of the glass sheets but also leaves a crust on them, which must be removed.

e) Immersion of Glass Sheet in an Alkaline Solution.

To achieve crust removal, it is necessary to introduce again the glass sheet or sheets in an alkaline solution, such as a 2% solution of caustic soda. To facilitate removal of the crust, the caustic solution is subjected to a stirring by bubbling process, for a time from 2 minutes to 5 minutes depending on the degree of crust removal.

f) Flushing Glass Plates

After removing the crust the glass sheet is carried to a second rinse step and the residual caustic soda solution present in the sheets and container is removed.

g) Immersion of Glass Sheets in an Acidic Solution

The next step is to introduce again one or more sheets of glass in an acidic solution. Said acidic solution may be a solution of 32.5% hydrofluoric acid. The immersion time will be from 30 to 600 seconds. With this immersion, the opacity generated in the previous step can be eliminated, keeping the roughness originated on the surface of the glass, making the glass resume its transparency but with a low level of light reflection.

h) Immersion of Glass Sheets in an Alkaline Solution.

Once completed the attack time with the 35% hydrofluoric acid solution, the glass sheet or sheets are introduced again in a tank containing a solution of 2% caustic soda. This stage aims to stop the reaction of hydrofluoric acid with glass. Such glass sheets are kept within the tank from 20 seconds to 60 seconds as required.

i) Rinsing and Drying the Glass Sheets

Once the glass sheet was treated with caustic soda, a second step of rinsing and drying takes place, to remove the residual solution of caustic soda present in the sheets and the tank.

Finally, once the product meets the required specifications and quality, it is taken to storage.

Per the above-described process, roughness measurements were made by profilometry for glass types ATR (anti reflection) and PAVIA® (Trademark of company Vitro Vidrio y Cristal), on both faces.

All measurements were made under the following conditions:

Swept area: 1.2×1.2 cm with sweeping steps every 1 μm.
Force applied to the sample: 10 mg.
Sweeping speed: 200 μm·s$^{-1}$
At atmospheric pressure and room temperature.

Figure 2:
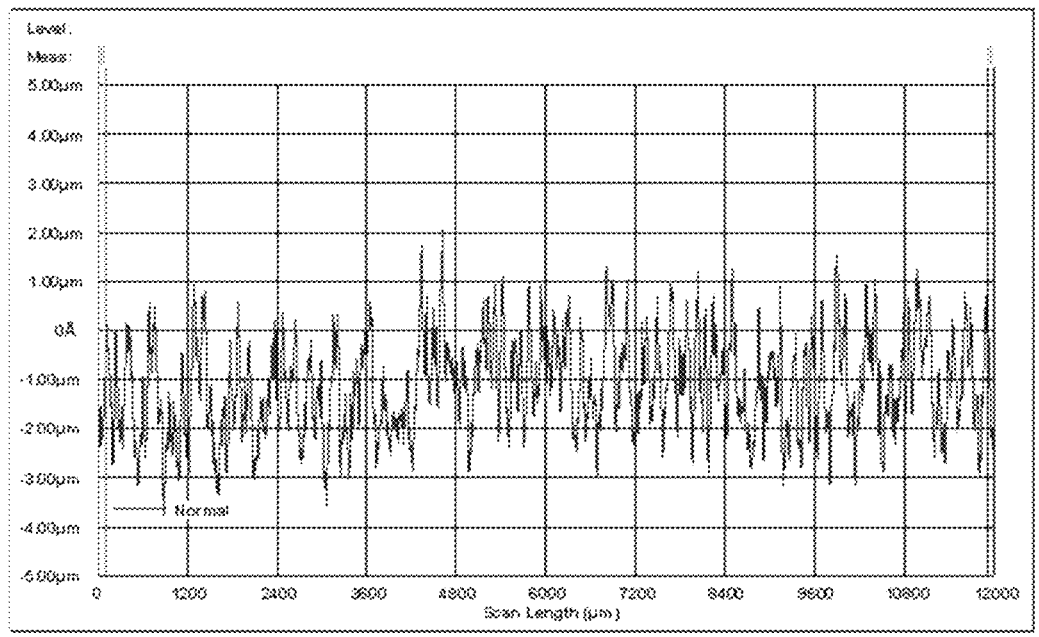
FIG. 2 shows a plot of roughness, in one dimension, for ATR glass, side one.
Figure 3:
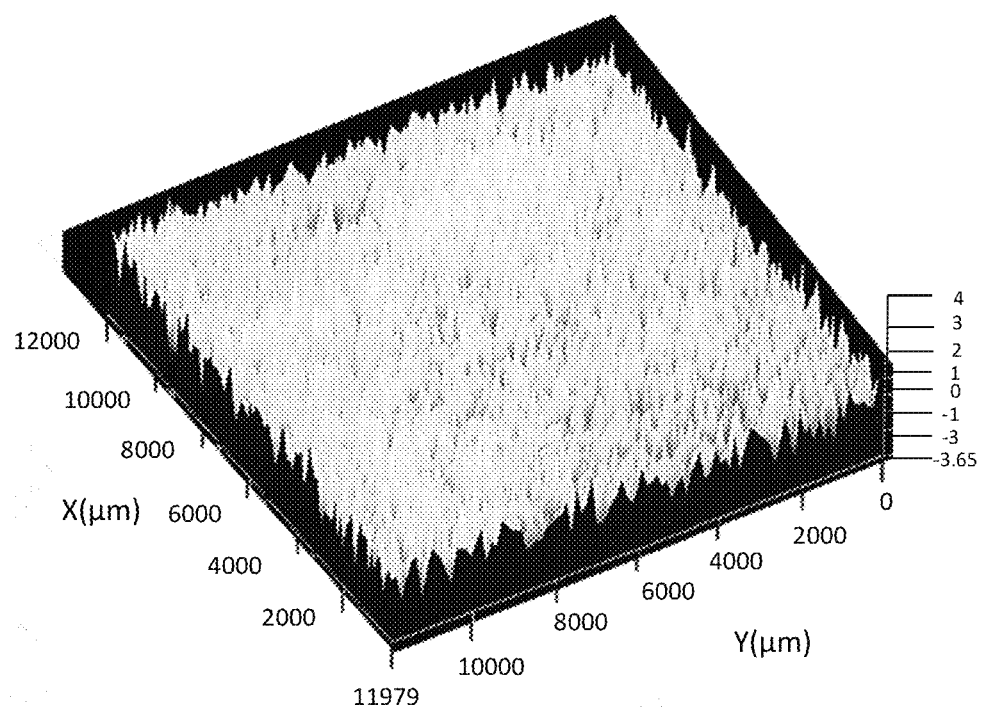
FIG. 3 shows an image of roughness for ATR glass, 3-dimensional, side two.
Figure 4:
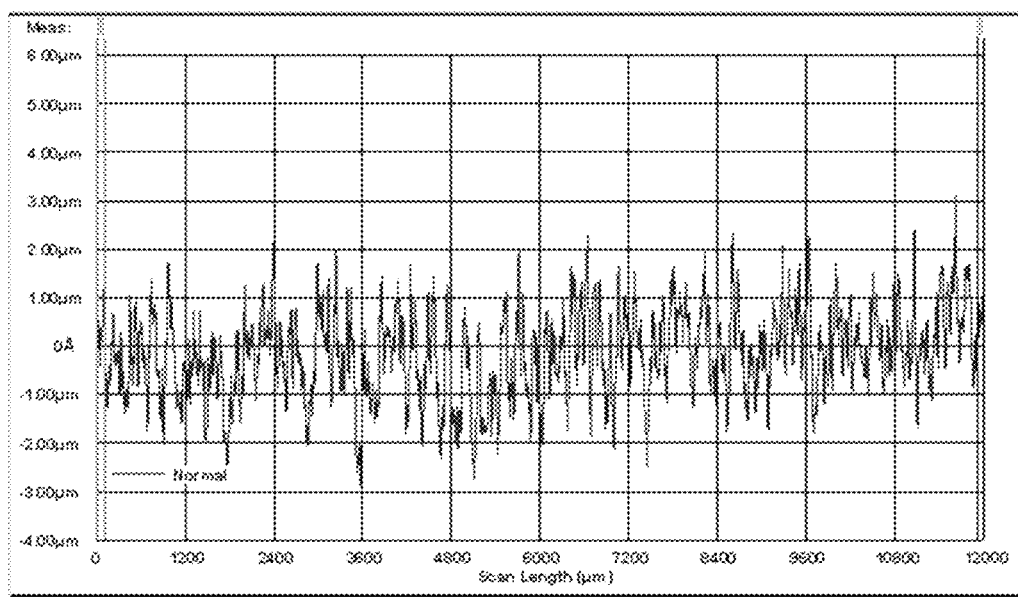
FIG. 4 shows a plot of roughness, in one dimension, for ATR glass, side two.
Figure 5:
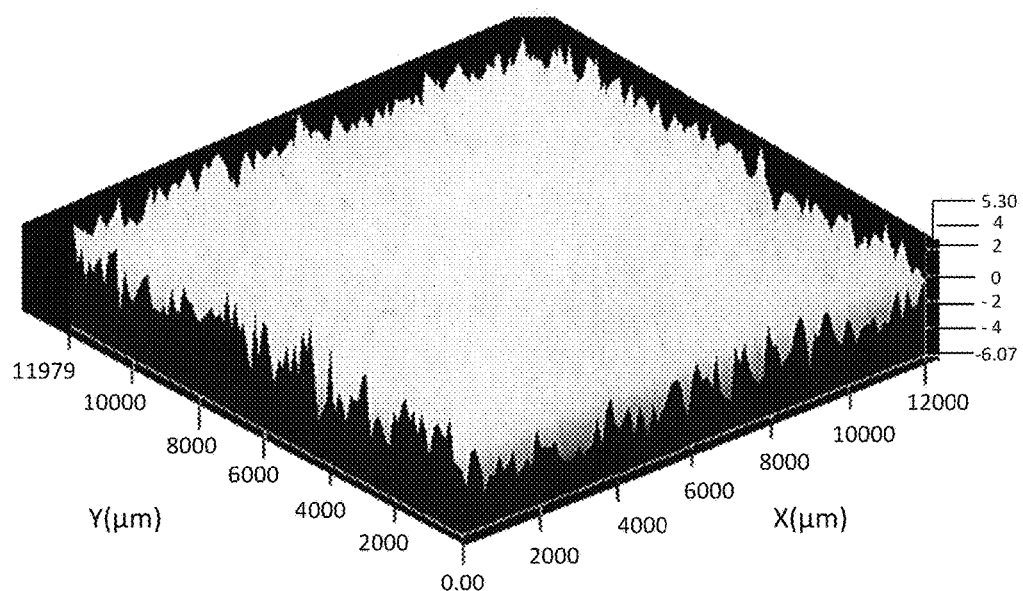
FIG. 5 shows an image of roughness for PAVIA glass, 3-dimensional, side one.
Figure 6:
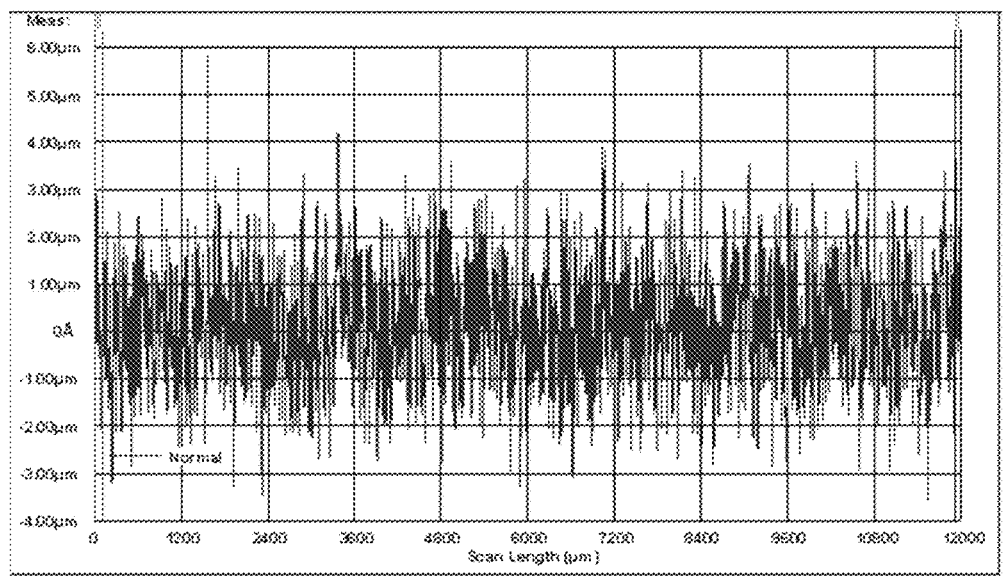
FIG. 6 shows a plot of roughness, in one dimension, for PAVIA glass, side one.
Figure 7:
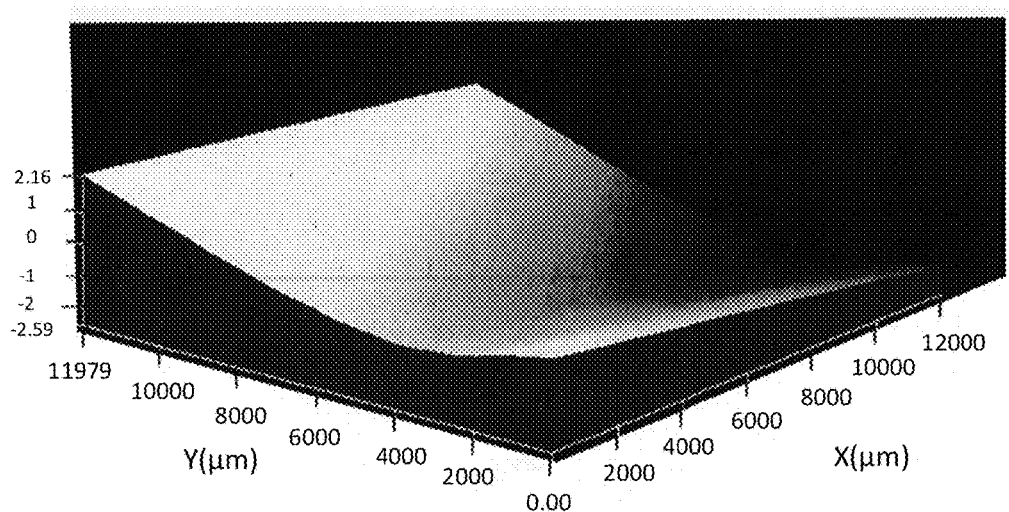
FIG. 7 shows an image of roughness for PAVIA glass, 3-dimensional, side two.
Figure 8:
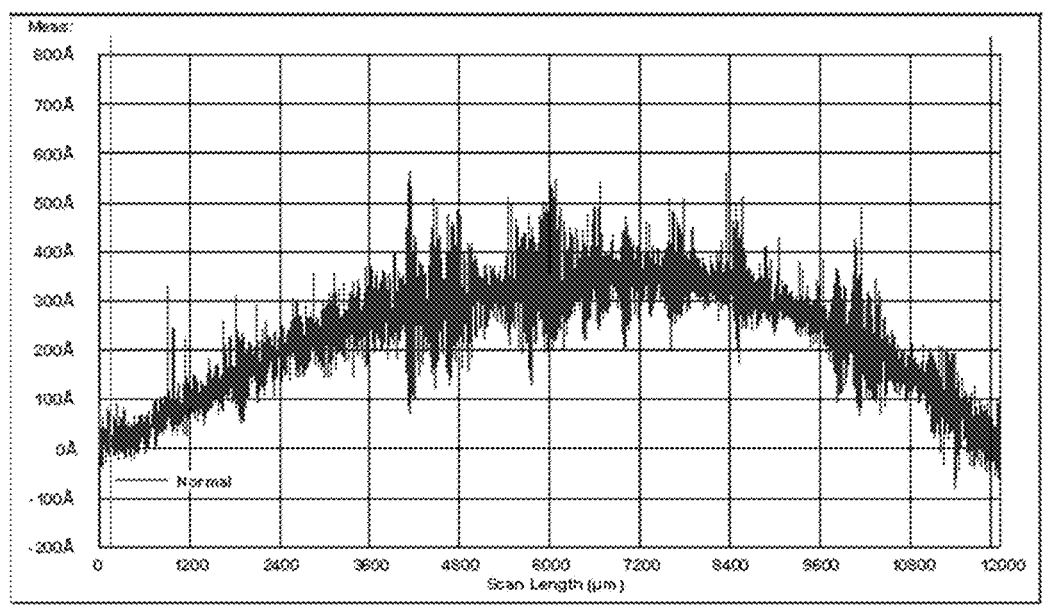
FIG. 8 shows a plot of roughness, in one dimension, for PAVIA glass, side two.

The results obtained are summarized in Tables 1, 2 and 3. FIGS. 1 to 8 show for each measurement, an image of 3D roughness and a graph of the roughness in one dimension.

TABLE 1

Parameters obtained from measurements

| | ATR | | PAVIA | |
|---|---|---|---|---|
| PARAMETER | Side 1 (attack) | side 2 (attack) | Side 1 (attack) | side 2 (No attack) |
| Roughness peak - valley (Rt) | 5.8343 μm | 5.9244 μm | 9.3790 μm | 0.0641 μm |
| Roughness average (Ra) | 0.8020 μm | 0.7081 μm | 0.9538 μm | 0.0091 μm |
| Roughness RMS | 0.9653 μm | 0.8764 μm | 1.1917 μm | 0.0111 μm |

TABLE 2

Optical Properties of Anti-Glare Glass (ATR)

| Sample (thickness) | T Solar | R Solar (Front) | R Solar (Back) | T light | R light (Front) | R Light (Back) | T UV |
|---|---|---|---|---|---|---|---|
| 2.0 ATR | 84.8% | 7.4% | 7.3% | 88.5% | 7.8% | 7.7% | 64.2% |

| | Color T | | | Color RDP | | | Color RDV | | |
|---|---|---|---|---|---|---|---|---|---|
| Sample | L* | a* | b* | L* | a* | b* | L* | a* | b* |
| 2.0 ATR | 95.353 | −0.698 | 0.256 | 33.515 | −0.585 | −0.347 | 33.345 | −0.582 | −0.231 |

T Solar: Solar transmission;
R Solar: Solar reflection;
T light: Light Transmission;
R Light: Light reflection

TABLE 3

Optical Properties of PAVIA Anti-Glare Glass

| Sample (thickness) | T Solar | R Solar (Front) | R Solar (Back) | T light | R light (Front) | R Light (Back) | T UV |
|---|---|---|---|---|---|---|---|
| 3.0 PAVIA | 82.60% | 6.00% | 6.00% | 88.60% | 6.50% | 6.50% | 70.20% |

| | Color T (Color to Transmission) | | | Color RDP (Color to reflection film side) | | | Color RDV (Color to reflection glass side) | | |
|---|---|---|---|---|---|---|---|---|---|
| Sample | L* | a* | b* | L* | a* | b* | L* | a* | b* |
| 3.0 PAVIA | 95.43 | 0.119 | 0.298 | 30.58 | 4.25 | 10.18 | 30.58 | 4.25 | 10.18 |

| Sample (thickness) | T Solar | R Solar (Front) | R Solar (Back) | T light | R light (Front) | R Light (Back) | T UV |
|---|---|---|---|---|---|---|---|
| 6.0 PAVIA | 74.10% | 5.50% | 5.50% | 84.50% | 6.20% | 6.20% | 59.60% |

| | Color T | | | Color RDP | | | Color RDV | | |
|---|---|---|---|---|---|---|---|---|---|
| Sample | L* | a* | b* | L* | a* | b* | L* | a* | b* |
| 6.0 PAVIA | 93.67 | 0.16 | 0.412 | 29.93 | 4.32 | 10.41 | 29.93 | 4.32 | 10.41 |

TABLE 3-continued

Optical Properties of PAVIA Anti-Glare Glass

| Sample (thickness) | T Solar | R Solar (Front) | R Solar (Back) | T light | R light (Front) | R Light (Back) | T UV |
|---|---|---|---|---|---|---|---|
| 12.0 PAVIA | 59.10% | 4.80% | 4.80% | 76.10% | 5.70% | 5.70% | 45.70% |

| | Color T | | | Color RDP | | | Color RDV | | |
|---|---|---|---|---|---|---|---|---|---|
| Sample | L* | a* | b* | L* | a* | b* | L* | a* | b* |
| 12.0 PAVIA | 89.98 | 0.249 | 0.662 | 28.66 | 4.47 | 10.86 | 28.66 | 4.47 | 10.86 |

| Sample (thickness) | T Solar | R Solar (Front) | R Solar (Back) | T light | R light (Front) | R Light (Back) | T UV |
|---|---|---|---|---|---|---|---|
| 19.0 PAVIA | 46.50% | 4.40% | 4.40% | 67.70% | 5.20% | 5.20% | 35.60% |

| | Color T | | | Color RDP | | | Color RDV | | |
|---|---|---|---|---|---|---|---|---|---|
| Sample | L* | a* | b* | L* | a* | b* | L* | a* | b* |
| 19.0 PAVIA | 85.94 | 0.351 | 0.953 | 27.64 | 4.64 | 11.33 | 27.46 | 4.64 | 11.33 |

From the above, a manufacturing process has been described to manufacture a diffuse glass and a resulting glass and it will be apparent to those skilled in the art that other possible advances or improvements can be performed, which may be considered within the field determined by the following claims.

The invention claimed is:

1. A process for manufacturing a diffuse finish on a glass sheet comprising the steps of:
   a) Providing a sheet of glass;
   b) Providing a first immersion of the glass sheet in a first acidic solution for a predetermined time, to remove impurities from the glass;
   c) Rinsing or washing the glass sheet once it has been immersed in the first acidic solution to remove the remaining acidic solution and avoid the formation of undesirable lines and marks in the glass;
   d) Providing a second immersion step to said glass sheet in a second acidic solution for a second predetermined time to generate a diffuse finish on both sides of the glass;
   e) Providing a third step of immersing the glass sheet from step d) in an alkaline solution for a third predetermined period;
   f) Rinsing or washing the glass sheet to remove any residual alkaline solution from the glass sheet;
   g) Providing a fourth immersion step to said glass sheet in a third acidic solution for a fourth predetermined period;
   h) Providing a fifth step of immersing the glass sheet from step g) in the alkaline solution of step e) to stop the reaction of the third acidic solution in said glass sheet; and
   i) Rinsing the glass sheet to remove residues of the alkaline solution.

2. The manufacturing process of glass sheets with diffuse finish in accordance with claim 1, wherein after step i) it comprises the step of: drying the glass sheet for storage.

3. The manufacturing process of glass sheets with diffuse finish in accordance with claim 1, wherein the first acidic solution is a hydrochloric acid solution.

4. The manufacturing process of glass sheets with diffuse finish in accordance with claim 1, wherein the time of immersion of the first glass sheet in step b) is from 20 to 60 seconds.

5. The manufacturing process of glass sheets with diffuse finish in accordance with claim 1, wherein the second acidic solution is a solution selected of ammonium difluoride, hydrochloric acid or a mixture thereof.

6. The manufacturing process of glass sheets with diffuse finish in accordance with claim 1, wherein the second immersion time of the glass sheet in step d) is from 30 to 300 seconds.

7. The manufacturing process of glass sheets with diffuse finish in accordance with claim 1, wherein the third acidic solution is a hydrofluoric acid solution.

8. The manufacturing process of glass sheets with diffuse finish in accordance with claim 1, wherein the time of immersion of the first glass sheet in step g) is from 30 to 600 seconds.

9. The manufacturing process of glass sheets with diffuse finish in accordance with claim 1, wherein the alkaline solution is a caustic soda solution.

10. The manufacturing process of glass sheets with diffuse finish in accordance with claim 1, wherein the immersion time in the alkaline solution of step e) is between 2 and 5 minutes.

11. The manufacturing process of glass sheets with diffuse finish in accordance with claim 1, wherein the immersion time in the alkaline solution of step h) is between 20 and 60 seconds.

12. The manufacturing process of glass sheets with diffuse finish in accordance with claim 1 wherein the glass sheet is supplied with a thickness between 2 and 19 mm.

13. The manufacturing process of claim 1, wherein the process generates in the glass sheets, on at least one side, a diffuse surface with a peak-valley roughness (Rt) from 5.8343 μm to 9.3790 μm; an average roughness (Ra) between 0.8020 μm and 0.9538 μm; RMS roughness between 0.9653 μm and 1.19167 μm; a solar transmission between 84.8% and 46.50%; a solar reflection between 7.4 and 4.4%; a light transmission between 88.5% and 67.70%; a reflection of light between 6.50% and 5.20%; and UV transmission between 35.60% and 70.20%.

14. The manufacturing process of claim 1, wherein the process generates in the glass sheets, on at least one side, a diffuse surface comprising:
   a peak-valley roughness (Rt) of about 5.9244 μm; an Ra roughness of about 0.7081 μm; an RMS roughness of about 0.8764 μm; a solar transmission of at least 84%; a solar reflectance of about 7.3%; a light transmission of about 88.5%; and UV transmission of about 64.2%.

15. The manufacturing process of claim 1, wherein the process includes in the glass sheet, on at least one side, a diffuse surface without attack, comprising: one peak-valley roughness (Rt) of about 0.0641 μm; an Ra roughness of about 0.0091 μm; and an RMS roughness of about 0.0111 μm.

* * * * *

UNITED STATES PATENT AND TRADEMARK OFFICE
CERTIFICATE OF CORRECTION

PATENT NO. : 10,358,382 B2
APPLICATION NO. : 15/322284
DATED : July 23, 2019
INVENTOR(S) : Jose Luis Tavares Cortes et al.

It is certified that error appears in the above-identified patent and that said Letters Patent is hereby corrected as shown below:

On the Title Page

Column 1, Applicant, Line 2, delete "Neuvo" and insert -- Nuevo --

In the Specification

Column 1, Line 8, delete "pf" and insert -- of --

Signed and Sealed this
Twenty-fourth Day of May, 2022

Katherine Kelly Vidal
*Director of the United States Patent and Trademark Office*